(12) United States Patent
Rao P

(10) Patent No.: US 12,640,960 B2
(45) Date of Patent: May 26, 2026

(54) ENHANCEMENT OF CONTROL PLANE AND DATA PLANE LEARNS FOR ROAMING HOSTS

(71) Applicant: HEWLETT PACKARD ENTERPRISE DEVELOPMENT LP, Spring, TX (US)

(72) Inventor: Gopinatha Rao P, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 217 days.

(21) Appl. No.: 18/643,807

(22) Filed: Apr. 23, 2024

(65) Prior Publication Data

US 2025/0260596 A1 Aug. 14, 2025

(30) Foreign Application Priority Data

Feb. 13, 2024 (IN) .............................. 202441009986

(51) Int. Cl.
  *H04L 12/46* (2006.01)
  *H04L 61/103* (2022.01)
(52) U.S. Cl.
  CPC ...... *H04L 12/4633* (2013.01); *H04L 12/4641* (2013.01); *H04L 61/103* (2013.01)
(58) Field of Classification Search
  None
  See application file for complete search history.

(56) References Cited

U.S. PATENT DOCUMENTS

| | | | | |
|---|---|---|---|---|
| 2013/0322453 A1* | 12/2013 | Allan | .................. | H04L 12/4633 |
| | | | | 370/395.53 |
| 2014/0348166 A1* | 11/2014 | Yang | .................. | H04L 12/4641 |
| | | | | 370/392 |
| 2015/0009992 A1* | 1/2015 | Zhang | ................ | H04L 12/4625 |
| | | | | 370/392 |
| 2015/0058470 A1* | 2/2015 | Duda | .................. | H04L 12/4633 |
| | | | | 709/224 |

FOREIGN PATENT DOCUMENTS

| | | | | | |
|---|---|---|---|---|---|
| CN | 102857588 B | * | 9/2015 | | |
| CN | 103647853 B | * | 7/2018 | ........... | H04L 61/103 |
| CN | 108270878 A | * | 7/2018 | ........ | H04L 12/4641 |
| CN | 107786677 B | * | 6/2021 | ......... | H04L 61/5053 |

OTHER PUBLICATIONS

Sajassi et al., "BGP MPLS-Based Ethernet VPN", Request for Comments: 7432, Feb. 2015, 56 pages.

* cited by examiner

*Primary Examiner* — Jeffrey R Swearingen
(74) *Attorney, Agent, or Firm* — Hewlett Packard Enterprise Patent Department

(57) ABSTRACT

In certain embodiments, computer-implemented method includes receiving, by a first VTEP, a network data unit intended for a host; performing a data plane learn to determine initial ARP information for the host including a first local connection between the host and the first VTEP; creating an initial first VTEP ARP entry for the host using the initial ARP information; transmitting the network data unit to the host; and transmitting a first control plane update including the initial ARP information to a second VTEP, the second VTEP having fast roaming enabled, wherein the second VTEP is configured to create, in response to receiving the first control plane update from the first VTEP, an initial second VTEP ARP entry for the host, the initial (Continued)

second VTEP entry comprising a tunnel connection between
the first VTEP and the second VTEP.

20 Claims, 5 Drawing Sheets

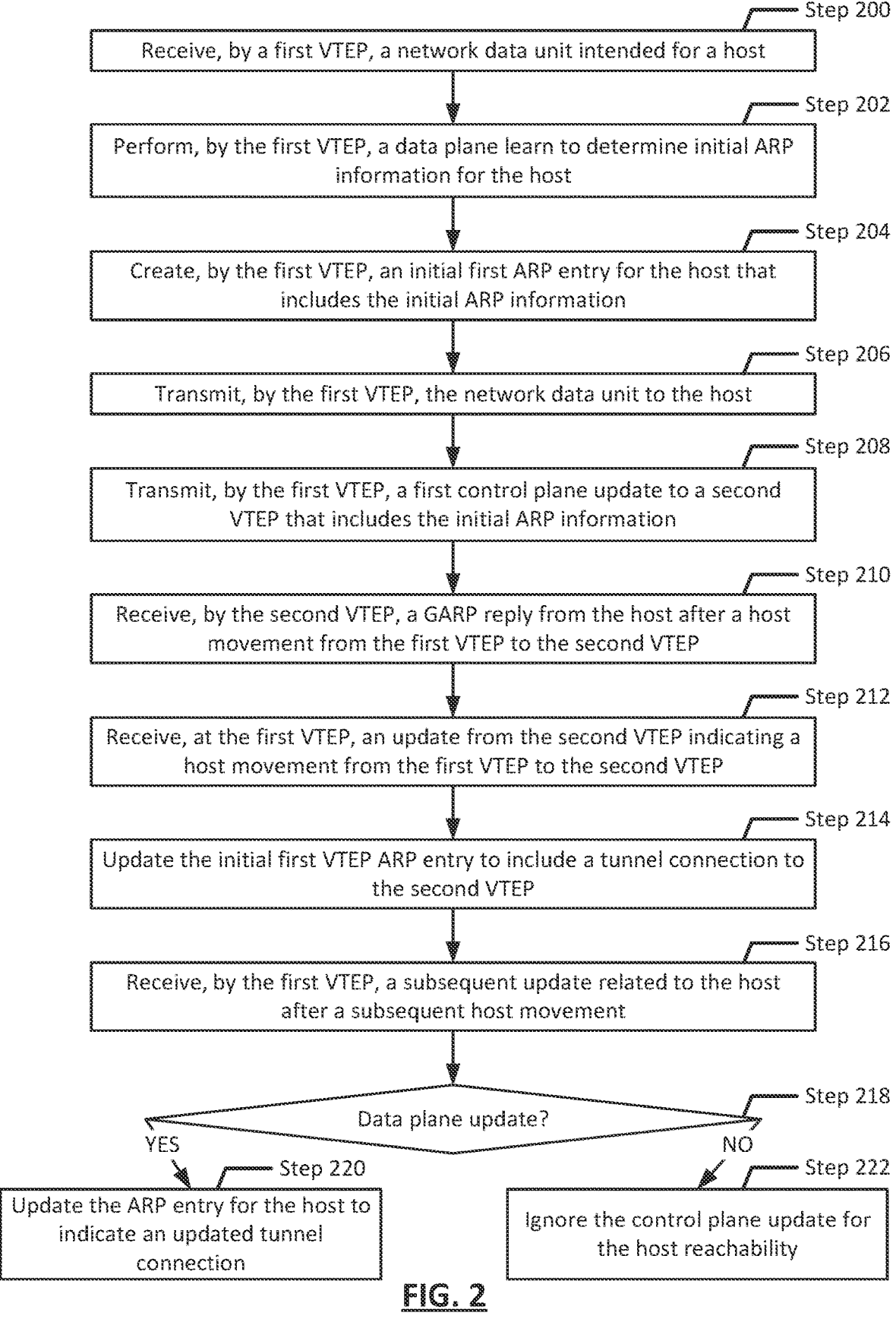

Step 200

Receive, by a first VTEP, a network data unit intended for a host

Step 202

Perform, by the first VTEP, a data plane learn to determine initial ARP information for the host Step 204

Create, by the first VTEP, an initial first ARP entry for the host that includes the initial ARP information Step 206

Transmit, by the first VTEP, the network data unit to the host

Step 208

Transmit, by the first VTEP, a first control plane update to a second VTEP that includes the initial ARP information Step 210

Receive, by the second VTEP, a GARP reply from the host after a host movement from the first VTEP to the second VTEP Step 212

Receive, at the first VTEP, an update from the second VTEP indicating a host movement from the first VTEP to the second VTEP Step 214

Update the initial first VTEP ARP entry to include a tunnel connection to the second VTEP Step 216

Receive, by the first VTEP, a subsequent update related to the host after a subsequent host movement Step 218

Data plane update?

YES        NO

Step 220

Update the ARP entry for the host to indicate an updated tunnel connection

Step 222

Ignore the control plane update for the host reachability

FIG. 2

ENHANCEMENT OF CONTROL PLANE AND DATA PLANE LEARNS FOR ROAMING HOSTS

BACKGROUND

In certain scenarios where users have devices that connect to a network (e.g., a campus network), users, and, consequently, their devices, may move between any number of physical locations served by the network. As such, a device may need to transition between network access devices from time to time in order to maintain network connectivity.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

FIG. 2 illustrates an overview of an example method for enhancement of data plane and control plane learns of host information in accordance with one or more embodiments disclosed herein;

DETAILED DESCRIPTION OF ILLUSTRATIVE EMBODIMENTS

Figure 1:
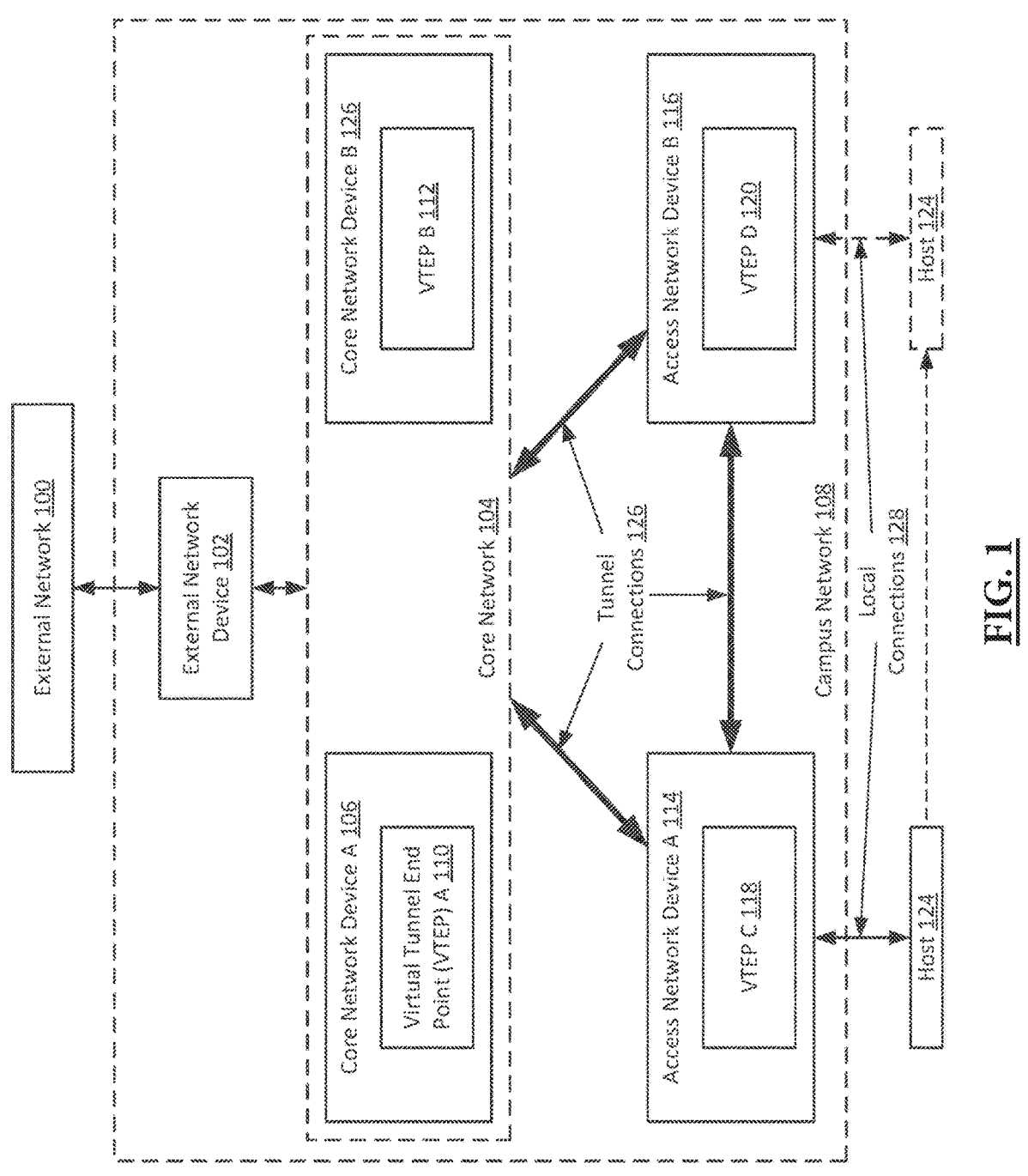
FIG. 1 illustrates a block diagram of an example system for enhancement of control plane and data plane learning in accordance with one or more embodiments disclosed herein.

Networks such as campus network deployments may use any number of access points that allow various devices (referred to herein as hosts) to connect to the network from different physical locations. Such campus networks may use Border Gateway Protocol (BGP) Ethernet Virtual Private Network (EVPN) Virtual extensible Local Area Network (VXLAN) (i.e., BGP EVPN VXLAN) techniques to provide connectivity to hosts as they move around physically within a campus network.

VXLAN may be considered an overlay network. VXLAN incorporates techniques by which layer 2 (L2) frames (e.g., including a media access control MAC header, and Internet Protocol (IP) header, any other relevant headers, and a data payload) is encapsulated into VXLAN packets having an outer Universal Datagram Protocol (UDP) header and an outer IP header, where the IP address in the outer IP header may be an IP address of a virtual tunnel endpoint (VTEP) (e.g., a VXLAN tunnel end point). A VTEP may be all or any portion of the hardware and/or software of a device (e.g., a network device). In one or more embodiments, a VTEP is a device, or portion thereof (e.g., any portion of the hardware and/or software of a device) that serves as a terminus for a virtual tunnel. A VTEP may thus perform encapsulation of network data units being transmitted via a virtual tunnel between devices (e.g., network devices) and decapsulation of network data units received via such a virtual tunnel, thereby serving as the 'endpoint' of the virtual tunnel. As an example, a VTEP may be all or any portion of the hardware components of a network device. As another example, a VTEP may be implemented using software executing on hardware of a device (e.g., a network device, a server device, etc.). As another example, a VTEP may be implemented using a combination of the hardware of a device and software executing on the device.

In the following description of embodiments disclosed herein, examples may be discussed in which a VTEP, or a network device VTEP, is described as performing various actions, operations, etc. (e.g., sending, transmitting, receiving, updating, etc.). References made herein to and/or about a device (e.g., a network device) that includes a VTEP are intended to encompass scenarios in which the device itself may be referred to as a VTEP. As an example, the term 'access network device VTEP' should be understood to refer to a device that includes a VTEP and any other hardware and/or software components of the network device. One of ordinary skill in the art, that has the benefit of this Detailed Description, will appreciate that when a VTEP, or a network device VTEP, is described herein as performing an action, operation, etc., the action, operation, etc. may be performed wholly by the VTEP or in conjunction with any other portion (e.g., hardware and/or software) of a device that includes a VTEP, and that any description of a connection (e.g., a local connection or a tunnel connection, described below) to a VTEP, or a network device VTEP, encompasses scenarios in which an operative connection exists to a device that includes a VTEP.

As an example, a VTEP may be described as receiving a network data unit, and then sending a network data unit over a local connection. In such an example, the network data unit may be received at an interface of a network device, provided to the VTEP for decapsulation, and then provided to other forwarding hardware of the network device to be transmitted from an interface of the network device towards the destination of the network data unit. As another example, a network device VTEP may be described as transmitting a network data unit. In such an example, the network device may or may not have been previously decapsulated by the network device VTEP, may have had any other actions performed on it by any other portion of the network device, and then may be encapsulated by the network device VTEP before being transmitted from an interface of the network device towards the destination of the network data unit. As another example, a VTEP, or a network device VTEP, may be described herein as sending, transmitting, receiving, etc. EVPN messages, address resolution protocol (ARP) messages (e.g., requests and/or replies), etc. In such examples, the action may be performed by the VTEP and/or any other relevant portion of the device that includes the VTEP to facilitate performance of the action.

VXLAN packets may use an existing underlay network (e.g., a layer 3 (L3) IP network) to transmit VXLAN packets through VXLAN tunnels between VTEPs, where the VXLAN packets may be decapsulated, and the contents therein used to propagate the network data unit (e.g., frame, packet, payload, etc.) towards its destination.

BGP is an exterior gateway protocol commonly used to allow network devices (e.g., routers) to exchange network reachability information (e.g., by exchanging routes). EVPN may be considered an extension to BGP that allows for control plane learning of L2 (e.g., MAC) and L3 (e.g., IP) reachability for hosts using a network implementing VXLAN. Thus, via the use of BGP EVPN VXLAN techniques, reachability information about VTEPs and hosts locally connected to network devices including VTEPs may be shared among the network devices.

Access network devices may be network devices (e.g., switches, routers, etc.) that provide network connectivity to devices in their proximity. Such network devices may be, include, and/or be operatively connected, for example, to wireless access points that provide network connectivity for hosts configured to use the campus network. In one or more embodiments, a network device providing access to a campus network may include a VTEP, thereby allowing the network device, and locally connected hosts, to use a VXLAN network implemented within the campus network.

At times, a given host may move from the proximity of one access point to another access point (e.g., by physically moving from the proximity of one wireless network access point device connected to an access network device to another), an action that may occur any number of times between any number of access points of a campus network. Thus, as discussed above, access network devices in a campus network may be configured with (or as) VTEPs when BGP EVPN VXLAN network techniques are being used in a campus network, and the network devices that include the VTEPs may locally connect to proximate hosts to provide network connectivity (referred to herein as a local connection), and may also operatively connect to hosts that are locally connected to different network devices that include VTEPs (which may be referred to herein as remote VTEPs) over virtual tunnels (e.g., VXLAN tunnels) between the VTEPs (referred to herein as tunnel connections).

In one or more embodiments, a local connection refers to an operative connection between a host and an access network device that includes a VTEP, which may be a direct connection (e.g., a wired connection), and/or may be through one or more intervening devices (e.g., a wireless access point connected to a network interface of an access network device).

When a VTEP of a network device receives a network data unit (e.g., a packet, frame, etc.) for a host connected to the network device via a local connection, the network device may provide the network data unit to the host over the local connection (e.g., from a network interface on an access network device to the host via a wireless access point connected to the network interface). When a VTEP of a network device receives a network data unit for a host that is locally connected to a different network device including a VTEP of the same campus network (which, again, may be referred to as a remote VTEP), the network device that includes the VTEP that receives the network data unit may transmit the network data unit to the remote VTEP via a tunnel connection between the VTEPs, and the remote VTEP may provide the network data unit to the host over a local connection between network device that includes the remote VTEP and the host.

As an example, when a host is locally connected to a network device including a VTEP, and the network device including VTEP has learned address resolution protocol (ARP) information for the host (e.g., host MAC address, host IP address, and network interface through which host may be reached), the network device including the VTEP will advertise reachability of the host from the network device including the VTEP to other devices in the campus network, such as core network devices from which network data units are received. Thus, when network data units for the host are received at a core network device, the core network device is aware that the network data units should be transmitted to the network device including the VTEP to which the host is locally connected for delivery to the host.

However, from time to time, ARP information may be deleted from network device including VTEPs (e.g., manual clearing of the ARP information, periodically scheduled clearing of ARP information, etc.) to cause the network device including VTEPs to re-learn (e.g., refresh) ARP information. The deletion of an ARP entry for a host during a clearing of ARP information is also advertised to other devices, such as the aforementioned core network devices in the campus network. Such core network devices may then have less specific information regarding the reachability of a host, and fall back to other policies for where to send network data units for the host (e.g., load balancing policies), which may cause network data units intended for a host to be sent to a network device including a VTEP to which a host is locally connected, or to one or more network device including VTEPs to which the host is not locally connected. In the second case, the one or more network device including VTEPs to which the host is not locally connected would need to send the network data unit over a tunnel connection to the VTEP to which the host is locally connected so that the network data unit may be provided to the host.

In BGP EVPN VXLAN campus network configurations, a flood and learn technique is often enabled to allow access network device network device including VTEPs to learn host reachability information based on data plane learning (e.g., ARP techniques), as data plane learning often provides faster convergence (e.g., thirty to fifty milliseconds) than control plane techniques (e.g., EVPN techniques) that may be possible in a BGP EVPN VXLAN campus network.

A flood and learn technique may involve an access network device VTEP receiving a network data unit destined for (or a request for information related to) a host that the access network device VTEP is not yet aware of. In order to learn how the host may be reachable, the access network device VTEP may flood an ARP request to operatively connected devices, and the relevant host may provide an ARP reply, which the access network device VTEP may use to update its ARP entry for the host. The ARP entry may, as an example, include the IP address that the network data unit is destined for (which was included in the ARP request sent by the access network device VTEP and corresponds to the host), a MAC address of the host learned from the host via the ARP reply to the ARP request, and a port (e.g., network interface, link, etc.) from which the network data unit should be sent to reach the host having the relevant MAC address and IP address.

Often, the host will be discovered (e.g., via the ARP request/ARP reply process), and the network data unit will be delivered as intended using information found in the ARP entry for the host when the host is currently locally connected to the access network device VTEP.

However, as discussed above, the host may not be currently locally connected to the access network device VTEP. In such cases, the network data unit intended for the host is either blackholed (e.g., dropped), or the access network device VTEP may know that the host is actually reachable by another access network device VTEP of the campus network. If the host is reachable via another access network device VTEP, the initial access network device VTEP that received the network data unit for the host may transmit the network data unit over a tunnel (e.g., a VXLAN tunnel) connection (e.g., rather than a local connection) to the access network device VTEP from which the host is reachable via a local connection. However, such indirect transmission of network data units to hosts may incur unwanted overhead in transmission time, and, correspondingly, delay in the host receiving the network traffic data unit.

In BGP EVPN VXLAN campus network configurations, there are often certain configuration settings that are intended to cause data plane learning techniques (e.g., flood and learn techniques) to be used to learn host reachability information instead of control plane learning techniques (e.g., EVPN techniques), which may provide the same information, but relatively more slowly. Such configuration settings are intended to provide preference to data plane learning techniques, because data plane techniques often provide faster convergence (e.g., host reachability information learning) than control plane techniques. However, such configuration settings may cause various issues that cause access network device VTEPs to fail to learn ARP information for hosts in a timely manner, and/or cause network data units intended for hosts on the campus network to be delivered less quickly, or not at all.

As an example, campus networks using BGP EVPN VXLAN are often configured such that the various access network device VTEPs have a virtual active gateway (VAG) configuration, where the access network device VTEPs have a common switch virtual interface (SVI) that has the same active gateway IP address and active gateway MAC address across the access network device VTEPs. Thus, an issue may arise if a given access network device VTEP receives a network data unit for a host to which it is not locally connected, and for which it has no ARP information.

In such a scenario, the access network device VTEP that received the network data unit may attempt to perform a flood and learn data plane learning technique by sending out an ARP request to operatively connected devices. Such an ARP request may be sent from all local ports to locally connected hosts, as well as from all tunnel ports connecting the access network device VTEP to remote access network device VTEPs of the campus network. When the host for which the network data unit is intended is locally connected to one of the remote access network device VTEPs, the host will receive the ARP request via its locally connected access network device VTEP, and provide an ARP reply, and the locally connected access network device VTEP may successfully add an ARP entry for the locally connected host.

However, due to the aforementioned VAG configuration, a remote access network device VTEP to which the host is locally connected, upon receiving an ARP reply, will see the destination MAC of the ARP reply as the active gateway MAC of its own SVI, and consume the ARP request without sending it to the access network device VTEP that transmitted the ARP request. Thus, the access network device VTEP that originated the ARP request may not receive the ARP reply (because it was consumed by the remote access network device VTEP to which the host was locally connected), and therefore cannot deliver the network data unit to the host via the tunnel to the remote access network device VTEP to which the host is locally connected. Therefore, the network data unit may be dropped (e.g., blackholed).

As another example, in BGP EVPN VXLAN configurations for campus networks with any number of access network device VTEPs that a host may connect to (e.g., from different physical locations), access network device VTEPs are often configured to ignore EVPN route type (RT) 2 (RT-2) updates when fast roaming is enabled on the access network device VTEP. An EVPN RT-2 update is when an access network device VTEP learns reachability information for a host (e.g., using ARP techniques for locally connected hosts), and provides an EVPN RT-2 update to remote access network device VTEPs to make the remote access network device VTEPs aware that the host is reachable via the access network device VTEP sending the EVPN RT-2 update. However, because of the aforementioned preference for the faster convergence offered by flood and learn techniques, the remote access network device VTEPs are often configured to ignore the EVPN RT-2 updates from other access network device VTEPs.

Thus, based on the two configuration scenarios described above, an access network device VTEP that receives a network data unit intended for a host to which the access network device VTEP is not locally connected (e.g., via a local port) fails to learn the reachability information using ARP-based flood and learn techniques, and has also failed to learn the reachability information for the host via an EVPN RT-2 update, which was ignored. Therefore, any network data units intended for the non-locally connected host arriving at the access network device VTEP may be blackholed until some future time when the host connects to the access network device VTEP locally, and the flood and learn technique for the host is successful.

In a scenario where a host moves (e.g., fast roams) from the proximity of the access network device VTEP to which it was previously locally connected to a new access network device VTEP, the host may be configured to send a gratuitous ARP (GARP) reply, which is an unsolicited ARP reply that is broadcast to devices to which the host is connected, such as the access network device VTEP to which the host is now locally connected.

However, an access network device VTEP receiving the GARP reply from the host may not have previously learned any reachability information about the host (e.g., because the access network device VTEP was configured to ignore EVPN RT-2 updates from other access network device VTEPs). When an access network device VTEP receives a GARP reply from a device for which the access network device VTEP has no previously learned ARP information, the access network device VTEP is often configured to ignore the GARP reply, because a GARP reply is generally used to cause an update to ARP information rather than to trigger a new ARP entry in the access network device VTEP's store of ARP information (which may be referred to herein as an ARP cache for the access network device VTEP).

Therefore, the access network device VTEP to which the host is now locally connected will not learn the ARP information for the host (which was in the GARP reply, but ignored) until such time as the access network device VTEP receives a network data unit for the host, and performs a flood and learn technique (e.g., using an ARP request) to find the locally connected host.

So, again, in this scenario, the host may not receive network data units intended to be received by the host, which are likely to be sent (e.g., by a core network device) to the access network device VTEP to which the host was previously locally connected (unless the ARP information of the previous access network device VTEP has been cleared), until the access network device VTEP to which the host was previously connected is able to learn that the access network device VTEP that ignored the GARP could, in fact, reach the host (e.g., by using flood and learn techniques when a network data unit is received), and sending the network data unit to the access network device VTEP that ignored the GARP, which, in turn, transmits the network data unit to the host, which may include unnecessary delay in the delivery of the network traffic data unit.

In order to address, at least in part, the aforementioned problems, embodiments disclosed herein include techniques for allowing faster convergence of access network device VTEPs learning host reachability information by being configured differently than the common configurations of BGP EVPN VXLAN campus networks discussed above.

Specifically, in one or more embodiments, access network device VTEPs of a campus network may be configured such that EVPN RT-2 updates (e.g., control plane updates) are accepted and assessed (which may be referred to herein as an arbitration assessment), instead of being ignored, when the access network device VTEP does not have any ARP information about a host, and to assess updates to host reachability information based on the source of the information after determining that the access network device VTEP does have ARP information corresponding to the host.

In one or more embodiments, the sources of information included in the arbitration assessment include control plane updates (e.g., EVPN RT-2 updates received over tunnel connections from other access network device VTEPs, which are control plane updates), locally learned host reachability information (e.g., via locally learned ARP information, which are data plane updates), and GARP information received from non-local sources (e.g., over a tunnel connection from another access network device VTEP, which are data plane updates) or local sources (e.g., over a local connection to a host, which are data plane updates). Details related to the assessment of whether an access network device VTEP should accept data plane updates and control plane updates to ARP entries for hosts of a BGP EVPN VXLAN campus network are discussed further below.

In one or more embodiments, when an access network device VTEP receives a network data unit for a host, the access network device VTEP should use its ARP information to determine whether an ARP entry exists for the host having the destination IP address specified in the network data unit, and which has a local port included in the ARP entry. In one or more embodiments, if such an ARP entry exists, the access network device VTEP should transmit the network data unit towards the host using the interface (e.g., port) specified in the ARP entry.

In one or more embodiments, if no such ARP entry exists, the access network device VTEP should perform a data plane technique (e.g., flood and learn) by sending an ARP request. In one or more embodiments, if an ARP reply is received from a locally connected host, the access network device VTEP should add an ARP entry to its ARP information that includes the IP address and MAC address of the host, and the local port through which the host may be reached, and then transmit the network data unit to the host using the local connection indicated by the local port.

In one or more embodiments, the access network device VTEP that learned the ARP information for the locally connected host via the ARP request should transmit a control plane update (e.g., an EVPN RT-2 update) to all (or at least a configured portion) of the remote access network device VTEPs of the campus network.

In one or more embodiments, even when fast roaming is enabled, access network device VTEPs in BGP EVPN VXLAN campus networks are configured to accept control plane updates (e.g., EVPN RT-2 updates) to ARP information when an access network device VTEP has no ARP entry for the host corresponding to the information in the control plane update (e.g., the IP address of the host, the MAC address of the host, and the tunnel connection over which the host may be reached).

Thus, in one or more embodiments, upon receiving such a control plane update, an access network device VTEP is configured to determine whether an ARP entry exists corresponding to the host of the control plane update. In one or more embodiments, when the access network device VTEP does not have any ARP entry for the host, the access network device VTEP adds an ARP entry for the host that includes the IP address of the host, the MAC address of the host, and the tunnel port over which the host is reachable (e.g., via another access network device VTEP), as specified in the control plane update. Thus, if any network data unit is received for the host at the access network device VTEP that received the control plane update, the access network device VTEP may lookup the host in the ARP information of the access network device VTEP to find the ARP entry added based on receipt of the control plane update, and send the network data unit over the tunnel connection included in the ARP entry.

In one or more embodiments, if a host moves from an access network device VTEP that has learned the ARP information of the host and has an ARP entry for the host specifying the local connection to the host from the access network device VTEP, the access network device VTEP to which the host moves will already have an ARP entry for the host specifying that the host is reachable via a tunnel connection from the new access network device VTEP to the access network device VTEP to which the host was previously connected.

Therefore, in one or more embodiments, when the host moves to the new access network device VTEP, and sends a broadcast GARP reply, the new access network device VTEP will not ignore the GARP reply (because it already has an ARP entry for the host), but instead will update the ARP entry for the host to include the local connection by which the host is now reachable instead of the tunnel connection to the access network device VTEP to which the host was previously connected and via which the host was previously reachable.

In one or more embodiments, if a host moves from an access network device VTEP that has learned the ARP information of the host and has an ARP entry for the host specifying the local connection to the host from the access network device VTEP, the access network device VTEP should retain that ARP entry until the access network device VTEP learns that a host movement (e.g., fast roam) has occurred (or until ARP information for the access network device VTEP is cleared for any reason).

In one or more embodiments, an access network device VTEP may learn that a host movement has occurred in one of two ways. In one or more embodiments, the first way is that the access network device VTEP may receive a data plane update (e.g., a GARP reply) broadcast from the host after the host movement, which is received over a tunnel connection from the access network device VTEP to which the host moved and to which the host is now locally connected.

In one or more embodiments, the second way is that the access network device VTEP may receive a control plane update (e.g., an EVPN RT-2 update) from the access network device VTEP to which the host moved and to which the host is now locally connected.

In one or more embodiments, in either case, the update indicates that the host has moved, and the access network device VTEP should update its ARP entry for the host to change the connection over which the host may be reached from the local connection that it learned previously to the tunnel connection received in the update.

In one or more embodiments, if an ARP entry for a host in the ARP information of an access network device VTEP already indicates that the host is reachable over a tunnel connection instead of a local connection, the VTEP should only update the ARP entry when a data plane update is received specifying a different tunnel connection.

As an example, if a first access network device VTEP has an ARP entry that indicates that a host is reachable over a tunnel connection to a second access network device VTEP, and then receives a control plane update from a third access network device VTEP, the first access network device VTEP should ignore the control plane update, and maintain the ARP entry without change.

However, if the first access network device VTEP receives a data plane update (e.g., a broadcast GARP reply) from the third access network device VTEP that indicates that the host is now reachable over a different tunnel connection than the tunnel connection in the present ARP entry for the host on the access network device VTEP, the VTEP should accept the data plane update, and update the ARP entry for the host to the include the new tunnel connection through which the host is reachable.

Certain embodiments of this disclosure may provide an updated configuration for access network device VTEPs in a campus network that allow the access network device VTEPs to assess control plane updates and data plane updates to ARP information of hosts on the campus network. In one or more embodiments, the updated configuration includes allowing access network device VTEPs that do not have an ARP entry for a host to accept control plane updates for a host and add an ARP entry for the host.

In one or more embodiments, for an access network device VTEP that has an ARP entry for a host that specifies a local connection to the host, the updated configuration of the access network device VTEP includes allowing the access network device VTEP to update the ARP entry when a host movement is determined, either via a data plane update or a control plane update received over a tunnel connection to another access network device VTEP, to include the tunnel connection instead of the local connection.

In one or more embodiments, the updated configuration includes causing the access network device VTEP to ignore control plane updates for host ARP information when the VTEP already has an ARP entry that includes a tunnel connection, and only update ARP entries for hosts when data plane updates are received over a tunnel connection.

In one or more embodiments, the updated configuration helps avoid network data units intended for a host from being blackholed when sent to an access network device VTEP of a campus network to which the host is not currently locally connected, as well helping to minimize scenarios where network data units are sent to an access network device VTEP to which a host was previously connected, and then must be sent to a different VTEP for delivery to the host.

Accordingly, embodiments disclosed herein may improve convergence time for campus networks when fast roaming is enabled, and also avoid potential loss of network traffic intended for hosts on the campus network.

FIG. 1 illustrates a block diagram of an example system for enhancement of control plane and data plane learning in accordance with one or more embodiments disclosed herein. As shown in FIG. 1, the system may include any number of hosts (e.g., host 124), an external network 100, and a campus network 108. The campus network may include an external network device 102, a core network 104 that includes any number of core network devices (e.g., core network device A 106, core network device B 126), and any number of access network devices (e.g., access network device A 114, access network device B 116). The core network devices (e.g., core network device A 106, core network device B 126), and access network devices (e.g., access network device A 114, access network device B 116) may include VTEPs (e.g., VTEP A 110, VTEP B 112, VTEP C 118, VTEP D 120). Each of these components is described below.

In one or more embodiments, the host 124 is any computing device capable of changing physical location relative to devices within a campus network (e.g., the campus network 108), and that includes appropriate components for connecting to a network (e.g., one or more network interface cards (NICs)).

As an example, the host may be a computing device that may move or be moved between different portions of a geographic location, different floors (e.g., via stairs, elevators, escalators, etc.), different buildings, different rooms, etc. In one or more embodiments, movement of the host may be referred to as roaming (e.g., a roaming host), fast roaming (e.g., implying relatively rapid movement around a campus network), and/or MAC movement (e.g., a host having one or more MAC addresses moving around a campus network).

As shown in FIG. 1, such movement of the host 124 is shown via a solid line representation of the host 124 existing in one position (e.g., connected to access network device A 114 in one portion of the campus network 108) and then, existing in a second position as a dashed line representation of the host 124 (e.g., connected to the access network device B 116), with the movement of the host shown by the dashed line pointing from the solid line representation of the host 124 to the dashed line representation of the host 124.

In one or more embodiments, as used herein, a computing device, such as the host 124, may be any single computing device, a set of computing devices, a portion of one or more computing devices, or any other physical, virtual, and/or logical grouping of computing resources. In one or more embodiments, a computing device is any device, portion of a device, or any set of devices capable of electronically processing instructions and may include, but is not limited to, any of the following: one or more processors (e.g. components that include circuitry) (not shown), memory (e.g., random access memory (RAM)) (not shown), input and output device(s) (not shown), non-volatile storage hardware (e.g., solid-state drives (SSDs), persistent memory (Pmem) devices, hard disk drives (HDDs) (not shown)), one or more physical interfaces (e.g., network ports, storage ports) (not shown), any number of other hardware components (not shown), and/or any combination thereof. As used herein, a processor may be any component that can be configured to execute operations. Examples of a processor include, but are not limited to, central processing units (CPUs), multi-core CPUs, application-specific integrated circuits (ASICs), accelerators (e.g., graphics processing units (GPUs)), field programmable gate arrays (FPGAs), etc.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (ISCSI) storage device, a tape storage device, a flash storage array, a network attached storage device, etc.), a network device (e.g., a mobile hotspot), a virtual machine, a virtualized computing environment, a logical container (e.g., for one or more applications), an Internet of Things (IoT) device, an array of nodes of computing resources, a super-computing device, and/or any other type of computing device capable of moving or being moved, and that may connect to a network.

Embodiments disclosed herein are not limited to the aforementioned examples of a computing device.

In one or more embodiments, any or all the aforementioned examples may be combined to create a system of such devices, or may be partitioned into separate logical devices, which may separately or collectively be referred to as a computing device (e.g., a host). Other types of computing devices may be used without departing from the scope of embodiments described herein, such as, for example, the computing device shown in FIG. 5 and described below. The system may include any number and/or type of such computing devices (e.g., hosts) in any arrangement and/or configuration without departing from the scope of embodiments disclosed herein.

In one or more embodiments, the storage and/or memory of a computing device or system of computing devices, such as the host 124, may be and/or include one or more data repositories for storing any number of data structures storing any amount of data (e.g., information). In one or more embodiments, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

In one or more embodiments, any storage and/or memory of a computing device or system of computing devices, and/or network devices, may be considered, in whole or in part, as non-transitory computer readable mediums storing software and/or firmware, which, when executed by one or more processors, cause the one or more processors to perform operations in accordance with one or more embodiments disclosed herein.

Such software and/or firmware may include instructions which, when executed by the one or more processors (not shown) and/or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The system may include any number of hosts, any number of which may be individually or collectively considered a computing device, as used herein. All or any portion of the computing devices may be the same type or be different types of computing devices.

In one or more embodiments, a host (e.g., the host 124 includes one or more NICs (not shown). In one or more embodiments, a NIC is any component that may allow a host to connect to a network, using any suitable or relevant technology or set of technologies. In one or more embodiments, a NIC is an input and/or output component of a host that is configured to provide an interface between a host (e.g., the host 124 and a network (e.g., the campus network 108, described below). In one or more embodiments, a NIC of a host (e.g., the host 124) is used to receive and/or transmit network data units.

A network data unit may include a payload (e.g., data intended for consumption by an entity receiving the network data unit) within any number of headers and/or trailers, which may be fields of information intended to allow receiving entities to perform various actions to propagate the network data unit towards a destination (e.g., another device).

Such fields of information may include, but are not limited to, various items of information related to protocols being used for implementing data transmission (e.g., media access control (MAC), internet protocol (IP), transmission control protocol (TCP), user datagram protocol (UDP), address resolution protocol (ARP), hypertext transfer protocol (HTTP), file transfer protocol (FTP), virtual extensible local area network (VXLAN) protocol, multiprotocol label switching (MPLS) segment routing (SR) protocols, etc.), addresses and/or labels related to such protocols (e.g., IP addresses, MAC addresses, label stacks, etc.), fields related to error identification and/or correction, etc.

A NIC may be configured with interfaces of any type for receiving and/or transmitting network data units, such as, for example, wireless interfaces, wired interfaces, etc.

In one or more embodiments, a host (e.g., the host 124) may connect to a campus network (e.g., the campus network 108) by connecting to an access network device (e.g., 114, 116) and, correspondingly, to a VTEP (e.g., the VTEP C 118 of the access network device 114, the VTEP D 120 of the access network device B 116). In one or more embodiments, connecting to a campus network (e.g., the campus network 108) may provide a host (e.g., the host 124) with an ability to communicate with other devices connected to the campus network, and/or to devices external to the campus network (e.g., with the external network device 102 and its connection to an external network 100).

In one or more embodiments, an external network (e.g., the external network 100) is a portion of a network that exists outside the set of devices implementing a campus network (e.g., the campus network 108). As an example, the external network 100 may be the Internet.

As used herein, a network (e.g., the external network 100, the campus network 108, the core network 104) may refer to an entire network or any portion thereof (e.g., a logical portion of the network devices within a topology of network devices). A network may be and/or include a datacenter network, a wide area network, a local area network, a wireless network, a cellular phone network, an InfiniBand network, and/or any other suitable network that facilitates the exchange of information (e.g., via transmission of network data units) from one part of the network to another. A network may be a combination of any of the aforementioned network types. A network may be located at a single physical location or be distributed at any number of physical sites. In one or more embodiments, a network (e.g., the external network 100) may be coupled with or overlap with, at least in part, the Internet.

In one or more embodiments, the external network 100 is operatively connected to the campus network, and networks and devices therein, via the external network device 102. In one or more embodiments, the external network device 102 is configured to serve as a gateway from the campus network 108 to the external network 100. Although FIG. 1 shows a single external network device 102, the system may include any number of similar external network devices without departing from the scope of embodiments disclosed herein.

In one or more embodiments, any network (e.g., the external network 100, the core network 104, the campus network 108) may include any number of network devices (e.g., the external network device 102, core network devices (e.g., 106, 126), access network devices (e.g., 114, 116)). The limited number of network devices shown in FIG. 1 are intended to show that any one or more networks are not limited to any particular number of network devices, and, as such, may include any number of network devices, which may be a large number of network devices in order to facilitate complex networks that are often implemented in campus network deployments.

In one or more embodiments, a network device (e.g., 102, 106, 108, 114, 116) is a device that includes and/or is operatively connected to persistent storage (not shown), memory (e.g., random access memory (RAM)) (not shown), one or more processor(s) (e.g., integrated circuits, ASICs, etc.) (not shown), and at least one physical network interface (not shown), which may also be referred to as a port, and which may provide connections (i.e., links) to other devices (e.g., computing devices, other network devices, etc.).

In one or more embodiments, a network device (e.g., 102, 106, 108, 114, 116) also includes any number of additional components (not shown), such as, for example, network chips, FPGAs, application specific integrated circuits (ASICs), indicator lights (not shown), fans (not shown), power supply units, power distribution units, etc. As an example, at least a portion of such hardware components may be included as part one or more of what may be referred to as line cards of a network device. In one or more embodiments, a line card, used here merely by way of example, refers to a collection of hardware components (e.g., connected by a printed circuit board) that include one or more physical interfaces (e.g., network ports) and any number of additional hardware components (e.g., ASICs, FPGAs, TCAMs, processor components, other memory components, etc.) that are used, at least in part, to store forwarding information and process network traffic. Forwarding information (which may include all or any portion of information that may be referred to as the 'FIB') may, for example, be stored (e.g., in various tables) in one or more hardware components of the line cards, such as MAC tables, route table entries, multicast forwarding entries, etc., which is sometimes referred to as being part of a data plane. In one or more embodiments, a network device includes information, such as a routing information base (RIB) that includes information (e.g., obtained from various routing protocols) that may be used to program components of the network device to propagate network data units. Such information is sometimes referred to as being in the control plane. A network device may include any other components in any arrangement without departing from the scope of embodiments described herein, and, as such is not limited to any arrangement of components shown in any figure and/or described herein.

In one or more embodiments, as discussed above, a network device includes at least one physical interface (and often two or more such physical interfaces). In one or more embodiments, physical interfaces are any hardware, software, or combination thereof that include functionality to receive and/or transmit network data units (e.g., packets, frames, etc.) or any other information to or from a network device. Physical interfaces may include any interface technology, such as, for example, optical, electrical, etc. Physical interfaces may be configured to interface with any transmission medium (e.g., optical fiber, copper wire(s), etc.).

In one or more embodiments, physical interfaces include and/or are operatively connected to any number of components used in the processing of network traffic. For example, a given physical interface may include a PHY (not shown), which is circuitry that connects a physical information propagation medium (e.g., a wire) to other components (e.g., the hardware components of a line card), which process network traffic. In one or more embodiments, physical interfaces include and/or are operatively connected to a transceiver, which provides the connection between the physical information transmission medium and the PHY. A PHY may also include any number of other components, such as, for example a serializer/deserializer (SERDES), and encoder/decoder, etc. A PHY may, in turn, be operatively connected to other any number of other components, such as, for example, a media access control (MAC) sublayer. Such a sublayer, may, in turn, be operatively connected to still other higher layer processing components, all of which form a series of components used in the processing of network traffic being received, transmitted, or otherwise used by a network device for any purpose.

In one or more embodiments, a network device includes any software (e.g., various daemons, a state database, etc.), firmware, etc. configured to perform and/or allow other components to perform various functions of the network device (e.g., to process network traffic). Such software may, for example, execute using one or more processors of a network device, or any other hardware resource of a network device capable of executing software.

Examples of a network device (e.g., 110, 112, 114) include, but are not limited to, a switch, a router, a multilayer switch, a fibre channel device, an InfiniBand® device, etc. A network device is not limited to the aforementioned specific examples. As an example, any computing device (discussed above) may be configured, at least in part, as a network device as used herein.

In one or more embodiments, a network device includes functionality to receive network data units (e.g., frames, packets, tunneling protocol frames, etc.) at any of the physical interfaces (e.g., ports) of the network device, and to process the network data units (e.g., to receive, transmit, consume, etc.). In one or more embodiments, processing a network traffic includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, decapsulate, etc.). Examples of network traffic processing include, but are not limited to, determining: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. A network device may perform other operations, functions, etc. with respect to a network data unit without departing from the scope of embodiments disclosed herein.

In one or more embodiments, as discussed above, the external network 100 may be operatively connected to the campus network 108 via one or more operative connections to one or more external network devices (e.g., the external network device 102). An external network device (e.g., the external network device 102) may, in turn, be operatively connected to a core network (e.g., the core network 104) via one or more operative connections to one or more core network devices.

In one or more embodiments, the core network 104 is a collection of core network devices (described above) (e.g., the core network device A 106, the core network device B108) that serve as an intermediate layer of a campus network (e.g., the campus network 108) between an external network device (e.g., the external network device 102) and any number of access network devices (e.g., the access network device A 114, the access network device 116). In one or more embodiments, the core network 104 provides connectivity between the access network devices (e.g., 114, 116) and to the external network 100 via the external network device 102.

In one or more embodiments, an access network device (e.g., the access network device A 114, the access network device B 116) is a network device that is operatively connected to any number of core network devices (e.g., 106, 108) and to any number of hosts (e.g., the host 124).

In one or more embodiments, a campus network (e.g., the campus network 108) includes one or more external network devices (e.g., the external network device 102), one or more core network devices (e.g., 106, 108), and any number of access network devices (e.g., 114, 116). Although not shown in FIG. 1, a campus network (e.g., the campus network 108) may include other devices, such as, for example, route reflectors (e.g., between the access network devices and the core network devices in order to avoid, at least in part, network topology complexity), and wireless access points (e.g., devices to which hosts connect wirelessly and which provide a local connection to access network devices). In one or more embodiments, the campus network 108 is a network that spans a particular geographic area. Examples of campus networks include, but are not limited to, networks at a school (e.g., a university campus), networks at a corporate location (e.g., a corporate campus), networks at a government facility (e.g., a government campus), etc.

In one or more embodiments, the campus network 108 includes any number of tunnel connections 126. As discussed above, a tunnel connection 126 is any operative connection between two network devices that include a VTEP, such as, for example, operative connections between access network devices and core network devices and/or connections between access network devices. In one or more embodiments, a tunnel connection 126 is used by a network device VTEP encapsulating network data units (e.g., in additional headers), sending the encapsulated network data units over the operative connection that is the tunnel connection 126, and decapsulating (e.g., by the receiving network device VTEP) the network data units.

In one or more embodiments, a VTEP (e.g., 110, 112, 118, 120) is an endpoint of a tunnel connection (e.g., a virtual tunnel). A VTEP may be included in a core network device (e.g., VTEPs 110, 112 on core network devices 106, 126) and/or included in an access network device (e.g., VTEPs 118, 120 on access network devices 114, 116). In one or more embodiments, a VTEP (e.g., 106, 108, 114, 116), or any other portion of a network device that includes a VTEP, may be configured to maintain ARP information that includes any number of ARP entries corresponding to any number of hosts, to receive and or transmit network data units to or from hosts and/or network devices, to provide encapsulation and/or decapsulation services to allow network data units to traverse tunnel connections, to send and/or receive data plane and/or control plane updates to ARP entries, etc.

In one or more embodiments, a VTEP (e.g., 118, 120) of an access network device (e.g., 114, 116) may have a local connection 128 to any number of hosts (e.g., the host 124). AS an example, any number of hosts may have a direct (e.g., wired) or indirect (e.g., wireless through a wireless access point) connection to an access network device that includes a VTEP. In one or more embodiments, as discussed above, a local connection 128 is any operative connection between a host (e.g., the host 124) and an access network device (e.g., 114, 116). In one or more embodiments, a local connection 128 may exist for any period of time, but may change when a host moves (e.g., roams) from one access network device (e.g., the access network device A 114) to another access network device (e.g., the access network device B 116), which may occur, for example, due to a physical movement of the host (e.g., movement between geolocations, movement between floors, movement between buildings, movement between rooms, etc.).

While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 1. Accordingly, embodiments disclosed herein should not be limited to the configuration of components shown in FIG. 1.

FIG. 2 illustrates an overview of an example method for enhancement of data plane and control plane learns of host information in accordance with one or more embodiments disclosed herein. All or any portion of the method shown in FIG. 2 may be performed, for example, by one or more devices or components (e.g., the access network devices 114 and 116 shown in FIG. 1, the VTEPs (118, 120) included therein, etc.) configured to perform at least a portion of the operations in accordance with one or more embodiments disclosed herein.

While the various steps in the flowchart shown in FIG. 2 are presented and described sequentially, some or all of the steps may be executed in different orders, some or all of the steps may be combined or omitted, other steps not shown in FIG. 2 may additionally be performed, and/or some or all of the steps may be executed in parallel with other steps of FIG. 2.

In Step 200, the method includes receiving, at a first access network device VTEP, a network data unit intended for a host (e.g., the host 124 of FIG. 1). As an example, the network data unit may be received by an access network device VTEP (e.g., the VTEP C 118 of FIG. 1) of an access network device (e.g., the access network device 114 of FIG. 1) from another access network device VTEP (e.g., a VTEP (110, 112, 120) of a core network device (106, 126) or another access network device (e.g., 116)). In one or more embodiments, although not shown in FIG. 2, the first access network device VTEP may perform a lookup of the host for which the network data unit is intended using host information (e.g., destination IP address of the network data unit) to determine if the access network device VTEP already includes and/or has access to an ARP entry for the host corresponding to the host, and, if so, forwards the network data unit to the host based on the ARP entry (e.g., from a local port included in the ARP entry).

In Step 202, the method includes, when the first access network device VTEP does not already include an ARP entry for the host, performing, by the first VTEP, a data plane learn to determine initial ARP information for the host. In one or more embodiments, a data plane learn is an attempt to learn ARP information for a host using flood and learn techniques, which may include sending an ARP request to operatively connected devices (e.g., hosts, remote VTEPs) over local and tunnel connections. In one or more embodiments, the flood and learn technique is successful when the host is locally connected to the VTEP initiating the ARP request. In one or more embodiments, as discussed above, the flood and learn technique may not be successful when the host is locally connected to a remote VTEP when the remote VTEP and the first VTEP are configured with a VAG configuration, as the remote VTEP may consume the ARP reply to the ARP request without sending the ARP reply from the host to the first VTEP. Thus, the network data unit may be dropped, or blackholed in such a scenario, which is a scenario that may be avoided via embodiments disclosed herein in which the remaining Steps of FIG. 2 are performed in a campus network. At this point in the method shown in FIG. 2, the host receives the ARP reply, as the host is locally connected to the first VTEP.

In Step 204, the method includes creating, by the first access network device VTEP, an initial first ARP entry for the host that includes the initial ARP information for the first host. In one or more embodiments, the initial ARP entry includes, at least, an IP address corresponding to the host, a MAC address corresponding to the host, and a local connection via which the host may be reached. Such information may be known, for example, based on the data plane learn performed in Step 202 (e.g., an ARP reply from the host responding to an ARP request). Subsequent network data units received for the host at the first access network device VTEP may be transmitted to the host based on the initial ARP entry corresponding to the host.

In Step 206, the method includes transmitting the network data unit received in Step 200 to the host. In one or more embodiments, the network data unit is transmitted to the host via the local connection included in the ARP entry created in Step 204.

In Step 208, the method includes transmitting, by the first access network device VTEP, a first control plane update, to a second access network device VTEP, that includes at least a portion of the first ARP information. In one or more embodiments, the first control plane update includes at least the IP address of the host and the MAC address of the host, and, optionally, an identifier of the tunnel connection between the first access network device VTEP and the second access network device VTEP. In one or more embodiments, the first control plane update is transmitted from the first access network device VTEP to the second access network device VTEP as an EVPN RT-2 update. In one or more embodiments, rather than ignoring such a control plane update, as is normally done in campus network VTEP configurations implementing BGP EVPN VXLAN techniques, the second access network device VTEP may use the control plane update to create an ARP entry for the host based on the control plane update. In one or more embodiments, the ARP entry for the host created by the second access network device VTEP includes, at least, the IP address and MAC address of the host, and the tunnel connection between the second access network device VTEP and the first access network device VTEP.

In Step 210, the method includes receiving, by the second access network device VTEP, a GARP reply from the host after a host movement from the first access network device VTEP to the second access network device VTEP. In one or more embodiments, Step 210 presumes that the host moved around the physical area of the campus network (e.g., by changing buildings, floors, etc.) such that the host is now more proximate to an access point connecting to an access network device that includes the second VTEP, and, thus, may be provided improved campus network access via the access network device that includes the second VTEP. In one or more embodiments, the host is configured for fast roaming, and, as such, is configured to transmit a GARP reply from time to time for any reason when roaming around the physical location served by the campus network. Thus, when the host moves near the proximity served by the second access network device VTEP, the second VTEP receives such a GARP reply from the host.

In one or more embodiments, in response to receiving the GARP reply from the host, the second access network device VTEP, instead of ignoring the GARP reply (as is generally done in networks implementing BGP EVPN VXLAN techniques without implementing embodiments disclosed herein), updates its ARP entry for the host, because the second access network device VTEP already has an ARP entry for the host as received via the control plane update of Step 208, which was accepted rather than ignored.

In Step 212, the method includes receiving, at the first access network device VTEP (e.g., the access network device VTEP to which the host was previously locally connected before the host movement from the first access network device VTEP to the second access network device VTEP), an update from the second access network device VTEP indicating a host movement from the first access network device VTEP to the second access network device VTEP. The update may be a data plane update (e.g., a GARP reply broadcast from the host to the second access network device VTEP and then to the first VTEP), or a control plane update (e.g., an EVPN RT-2 update from the second access network device VTEP).

In Step 214, the method includes updating, by the first access network device VTEP, the initial first ARP entry on the first access network device VTEP to include the tunnel connection to the second access network device VTEP instead of the local connection to the first host that was previously included in the initial first ARP entry. In one or more embodiments, when an update related to a host is received as a data plane update (e.g., a GARP reply) or a control plane update (e.g., an EVPN RT-2 update), such an update indicates a host movement from the host being locally connected to the access network device VTEP to the host being locally connected to another (e.g., remote) access network device VTEP. In such a scenario, the first access network device VTEP is configured to honor the update by updating the ARP entry for the host to include the tunnel connection to the access network device VTEP to which the host is now locally connected instead of the local connection to the host that was previously included in the ARP entry corresponding to the host. In one or more embodiments, the first access network device VTEP is configured to honor such updates because the update indicates the host has undergone a host movement that necessitates an update to the ARP entry from a local connection to a tunnel connection, which allows the first access network device VTEP to send any network data units received for the host to the host via the tunnel connection to the second VTEP.

In Step 216, the method includes receiving, by the first access network device VTEP, a subsequent update related to the host after a subsequent host movement. In one or more embodiments, in a campus network, a host may move between any number of access network device VTEPs on any number of access network devices any number of times. As such, the access network device VTEPs in the campus network may need to update host reachability information on an on-going basis. In one or more embodiments, such host reachability information may take the form of data plane updates provided to the access network device VTEPs (e.g., in the form of GARP replies) or control plane updates (e.g., in the form of EVPN RT-2 updates), each of which may be received from other access network device VTEPs in a campus network. Thus, in one or more embodiments, an access network device VTEP may receive such updates indicating host movement each time a host roams from one access network device VTEP to another access network device VTEP.

In Step 218, the method includes determining, by the first access network device VTEP, whether the update received in Step 216 is a data plane update or a control plane update. In one or more embodiments, if the update is a data plane update, the method proceeds to Step 220. In one or more embodiments, if the update received in Step 216 is a control plane update, the method proceeds to Step 222.

In Step 220, the method includes updating, by the first access network device VTEP, the ARP entry for the host on the first VTEP to indicate an updated tunnel connection by which the host is reachable. In one or more embodiments, the ARP entry is updated because it is a data plane update (e.g., a GARP reply), and data plane updates to ARP entries that already include tunnel connections are honored, and cause an update of the ARP entry.

In Step 222, the method includes ignoring, by the first access network device VTEP, the control plane update for the host reachability. As an example, when a control plane update (e.g., an EVPN RT-2 update) is received from another VTEP, the first VTEP may be configured to ignore such updates when an ARP entry of the first VTEP that corresponds to the host already includes a tunnel connection. As used in the description of this Step 222, the phrase 'configured to ignore' may mean that the access network device VTEP is configured to take no action (e.g., perform no ARP entry updates) in response to receipt of a control plane update corresponding to a host when the access network device VTEP already includes an ARP entry for the host that includes a tunnel connection. In one or more embodiments, the first access network device VTEP may instead wait for a data plane update (e.g., a GARP reply) that indicates a host movement before updating an ARP entry corresponding to the host.

Figure 3:
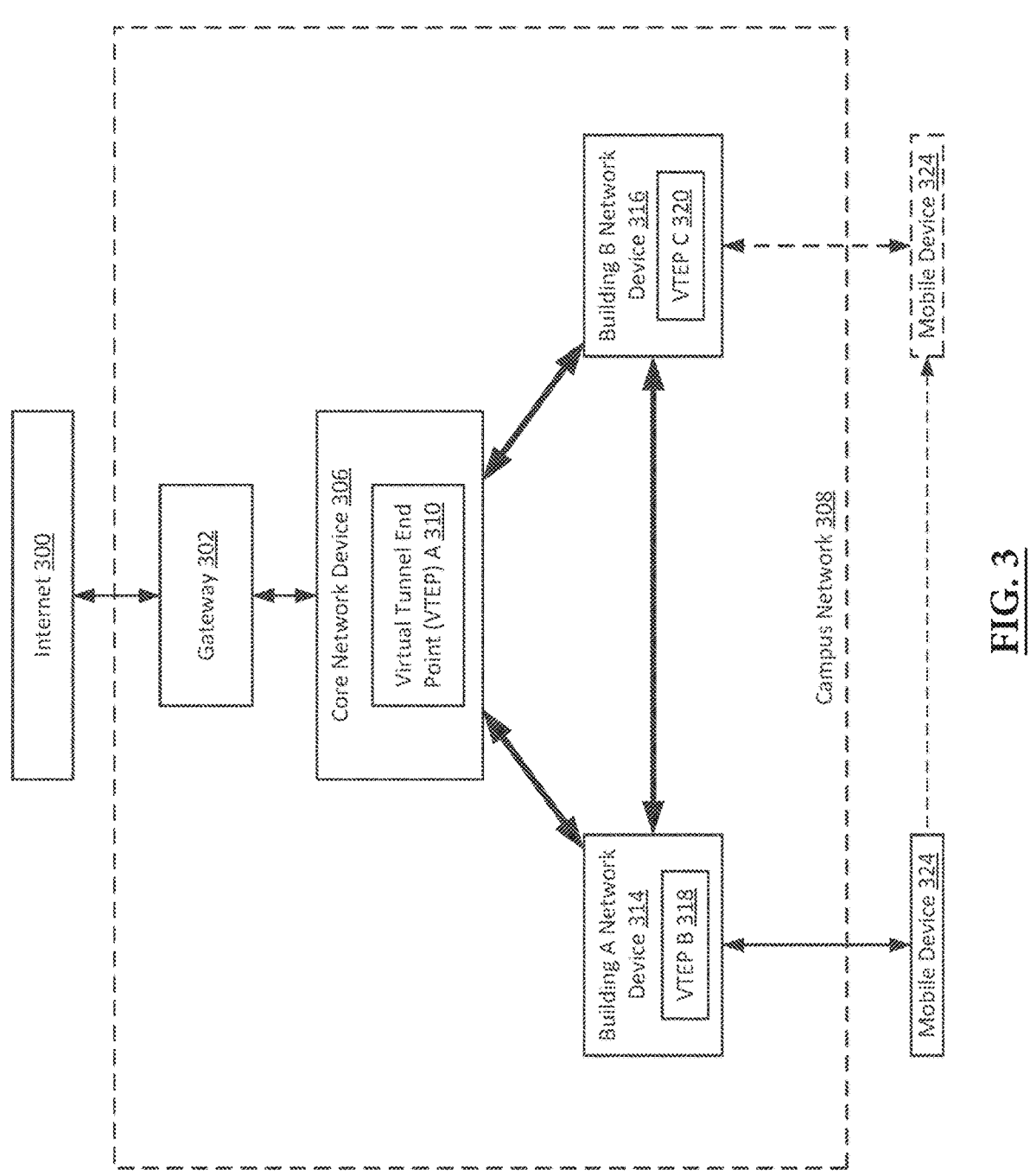
FIG. 3 illustrates an example system for enhancement of data plane learning and control plane learning for fast roaming hosts in a campus network in accordance with one or more embodiments disclosed herein.

FIG. 3 illustrates an example system for enhancement of data plane learning and control plane learning for fast roaming hosts in a campus network in accordance with one or more embodiments disclosed herein. The example shown in FIG. 3 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example. In the example of FIG. 3 described below, various VTEPs may be described as performing various actions (e.g., sending, transmitting, receiving, accessing, updating, ignoring, etc.). As discussed above, one of ordinary skill in the art will appreciate that references to such actions performed by VTEPs may refer to actions performed, in whole or in part, by the VTEPs and/or any other portion (e.g., hardware and/or software) of the device that includes the relevant VTEP.

Consider a scenario in which a university implements a campus network 308. The campus network 308 has a gateway 302 that provides a connection to the Internet 300, and also connects to a core network device 306 that includes a VTEP A 310. The university has two buildings for students, building A and building B, in which the campus network is implemented via the building A network device 314 in building A and the building B network device 316 in building B. A VTEP B 318 is included in the building A network device 314. A VTEP C 320 is included in the building B network device 316.

In such a scenario, a student at the university carries a mobile device 324. At the beginning of the day the student attends a class in building A, and brings the mobile device 324. The student uses the mobile device 324 to access the campus network 308. The VTEP B 318 learns via a data plane learn that the mobile device 324 has a MAC address, an IP address, and may be reached over a local port, which are used to create an ARP entry for the mobile device 324. Thus, for example, a network data unit sent over the internet to the mobile device 324 may be received at the gateway 302, and passed to the core device 306. If the VTEP A 310 on the core device does not have access to a specific ARP entry for the mobile device 324, the VTEP A 310 may follow a load balancing to determine which of VTEP B 318 and VTEP C 320 should be sent the network data unit. However, in this scenario, when the VTEP B 318 learned the ARP entry for the mobile device 324, the VTEP B 318 communicated the ARP information to the VTEP A 310. Thus, the VTEP A 310 sends the network data unit to the VTEP B 318 over a tunnel connection between the two VTEPs, and the VTEP B 318 provides the network data unit to the mobile device 324 over the local connection between the mobile device 324 and the VTEP B 318.

The VTEP B 318 also sends an EVPN RT-2 update with the ARP information of the mobile device 324 to the VTEP C 320. The VTEP C 320, being configured according to embodiments disclosed herein, accepts the EVPN RT-2 update, and creates an ARP entry for the mobile device 324 that includes the MAC address and IP address of the mobile device 324, and also includes an identifier of the tunnel connection between the VTEP C 320 and the VTEP B 318. Therefore, if a network data unit intended for the mobile device 324 arrives at the VTEP C 320 (e.g., because the ARP entry for the mobile device at the VTEP A 310 was cleared and the load balancing policy of the core network device 306 selected the VTEP C 320 to receive the network data unit), the VTEP C 320 will transmit the network data unit over the tunnel connection to the VTEP B 318 for delivery to the mobile device 324.

After the class in building A ends, the student, with the mobile device 324, walks over to the building B, where the student library is housed. The mobile device 324 sends a GARP reply when the student reaches building B. When the GARP reply is received at the VTEP C 320, because the VTEP C 320 already has an ARP entry for the mobile device 324, the VTEP C 320 updates the ARP entry for the mobile device to include the local connection over which the GARP reply was received instead of the tunnel connection to the VTEP B 318.

The GARP reply is also sent to the VTEP B 318, as it as a broadcast reply. Additionally, the VTEP C 320 sends an EVPN RT-2 update to the VTEP B 318 that includes the new ARP information of the mobile device 324. Both the GARP reply and the EVPN RT-2 update indicate to the VTEP B 318 that a host movement has occurred (e.g., the mobile device 324 fast-roamed from building A to building B). As the VTEP B 318 has an ARP entry for the host that includes a local connection to the host, whichever of the two updates is received first will cause the VTEP B 318 to update the ARP entry for the mobile device 324 to include the tunnel connection from VTEP B 318 to VTEP C 320 instead of the local connection that was previously included in the ARP entry for the mobile device 324. Whichever of the two updates that is received second will cause no change to the ARP entry for the host at the VTEP B 318, as the information included in the later received update is the same as the information received in the earlier received update.

Figure 4:
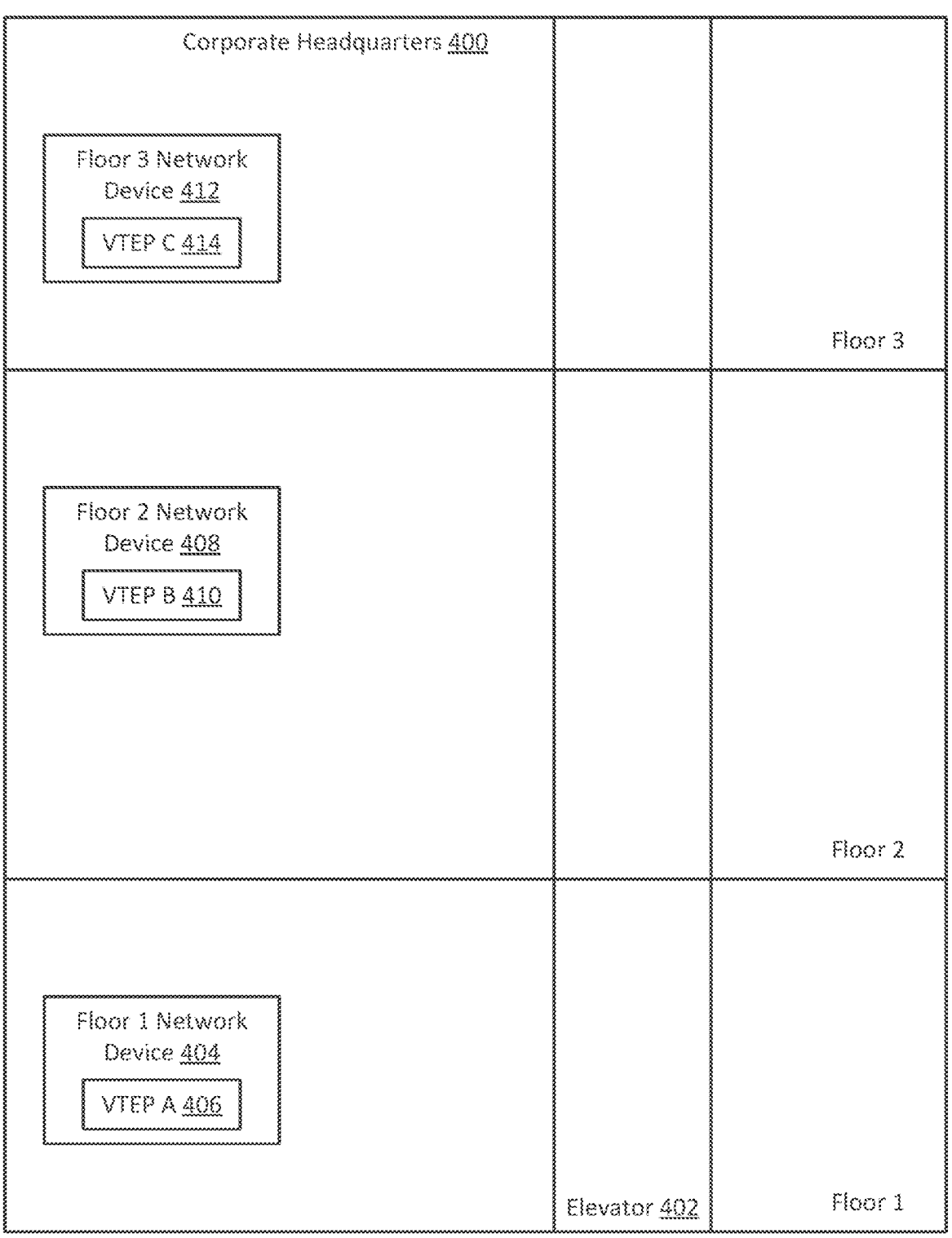
FIG. 4 illustrates an example system for enhancement of data plane learning and control plane learning for fast roaming hosts in a campus network in accordance with one or more embodiments disclosed herein.

FIG. 4 illustrates an example system for enhancement of data plane learning and control plane learning for fast roaming hosts in a campus network in accordance with one or more embodiments disclosed herein. The example shown in FIG. 4 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example. In the example of FIG. 4 described below, various VTEPs may be described as performing various actions (e.g., sending, transmitting, receiving, accessing, updating, ignoring, etc.). As discussed above, one of ordinary skill in the art will appreciate that references to such actions performed by VTEPs may refer to actions performed, in whole or in part, by the VTEPs and/or any other portion (e.g., hardware and/or software) of the device that includes the relevant VTEP.

Consider a scenario in which a company has a corporate headquarters 400 in which a campus network is implemented. The corporate headquarters has three floors, floor 1, floor 2, and floor 3. Each of the three floors has an access network device (e.g., 404, 408, and 412) on which respective VTEPs execute (e.g., 406, 410, 414).

In this scenario, an employee of the company enters the campus headquarters on floor 1 where his cubicle exists. After some time, the employee takes the elevator to the second floor for a first meeting, then takes the elevator to the third floor for a second meeting, and then, finally, returns to the cubicle on floor 1 to get some actual work accomplished. The employee has a laptop that they brought into floor 1, and took to both meetings. Thus, the laptop, which the employee uses to access the campus network, started on the floor 1, then moved to floor 2, to floor 3, and back to floor 1. The laptop has an IP address IP1, and a MAC address M1. Embodiments disclosed herein are implemented for the campus network. Therefore, the state of the ARP entries corresponding to the laptop are as follows.

Initially, VTEP A 406 has an ARP entry that includes M1, IP1 and the local port through which the laptop is reachable when the laptop is initially on floor 1. VTEP A 306 sends EVPN RT-2 updates to VTEP B 410 and VTEP C 414. Thus, VTEP B 410 has an ARP entry for the laptop that includes M1, IP1 and the tunnel connection between VTEP B 410 and VTEP A 406, and VTEP C 414 has an ARP entry for the laptop that includes M1, IP1, and the tunnel connection between VTEP C 414 and VTEP A 406.

When the employee goes to floor 2 for the first meeting, the laptop sends broadcasts a GARP reply. Because the VTEP B 410 on floor 2 already had an ARP entry for the laptop, the VTEP B 410 updates the ARP entry to include M1, IP1, and a local connection to the laptop (instead of the tunnel connection previously included in the ARP entry for the laptop). The VTEP B 410 sends an EVPN RT-2 update to both VTEP A 406 and VTEP C 414 that indicates that the host is now reachable via VTEP B 410. Additionally, the GARP reply, being a broadcast reply, is transmitted to VTEP A 406 and VTEP C 414.

VTEP A 406 has an ARP entry that includes the local connection through which the laptop was reachable before the move to floor 2. Thus, regardless of whether the GARP reply or the EVPN RT-2 update is received first, VTEP A 406 updates the ARP entry for the laptop to include the tunnel connection from VTEP A 406 to VTEP B 410 instead of the local connection.

VTEP C 414 has an ARP entry for the laptop that already includes a tunnel connection (the tunnel connection from VTEP C 414 to VTEP A 406). Therefore, VTEP C will not accept a control plane update (e.g., the EVPN RT-2 update from VTEP B 410) to update from one tunnel connection to another tunnel connection. Instead, VTEP C 414 will only update its ARP entry for the laptop to another tunnel connection based on a data plane update (e.g., the GARP reply). Thus, once the GARP reply is received, VTEP C 414 updates the ARP entry for the laptop to include the tunnel connection from VTEP C 414 to VTEP B 410 instead of the tunnel connection from VTEP C 414 to VTEP A 406.

When the employee later goes to floor 3 for the second meeting, a similar process happens. The laptop broadcasts a GARP reply. VTEP C 414 receives the GARP reply (a data plane learn), and updates its ARP entry for the laptop to include the local connection through which the laptop is now reachable instead of the tunnel connection between VTEP C 414 and VTEP B 410, and sends an EVPN RT-2 update to VTEP A 406 and VTEP B 410. VTEP B 410, having an ARP entry for the laptop that includes a local connection, will update its ARP entry for the laptop to include a tunnel connection between VTEP B 410 and VTEP C 414 instead of the local connection, based on receipt of either the broadcast GARP reply sent when the laptop moved to floor 3 or the EVPN RT-2 update from VTEP C 414. VTEP A 406, which has an ARP entry that includes a tunnel connection, will ignore the EVPN RT-2 update from VTEP C 414, and only update its ARP entry for the laptop to include a tunnel connection from VTEP A 406 to VTEP C 414 instead of the tunnel connection from VTEP A 406 to VTEP B 410 when VTEP A 406 receives the broadcast GARP reply sent when the laptop moved to floor 3.

When the employee finally goes back to floor 1 after the second meeting, a similar process again happens. The laptop broadcasts a GARP reply. VTEP A 406 receives the GARP reply (a data plane learn), and updates its ARP entry for the laptop to include the local connection through which the laptop is now reachable instead of the tunnel connection between VTEP A 406 and VTEP C 414, and sends an EVPN RT-2 update to VTEP B 410 and VTEP C 414. VTEP C 414, having an ARP entry for the laptop that includes a local connection, will update its ARP entry for the laptop to include a tunnel connection between VTEP C 414 and VTEP A 406 instead of the local connection, based on receipt of either the broadcast GARP reply sent when the laptop moved to floor 1 or the EVPN RT-2 update from VTEP A 406. VTEP B 410, which has an ARP entry that includes a tunnel connection, will ignore the EVPN RT-2 update from VTEP A 406, and only update its ARP entry for the laptop to include a tunnel connection from VTEP B 410 to VTEP A 406 instead of the tunnel connection from VTEP B 410 to VTEP C 414 when VTEP B 410 receives the broadcast GARP reply sent when the laptop moved to floor 1.

Figure 5:
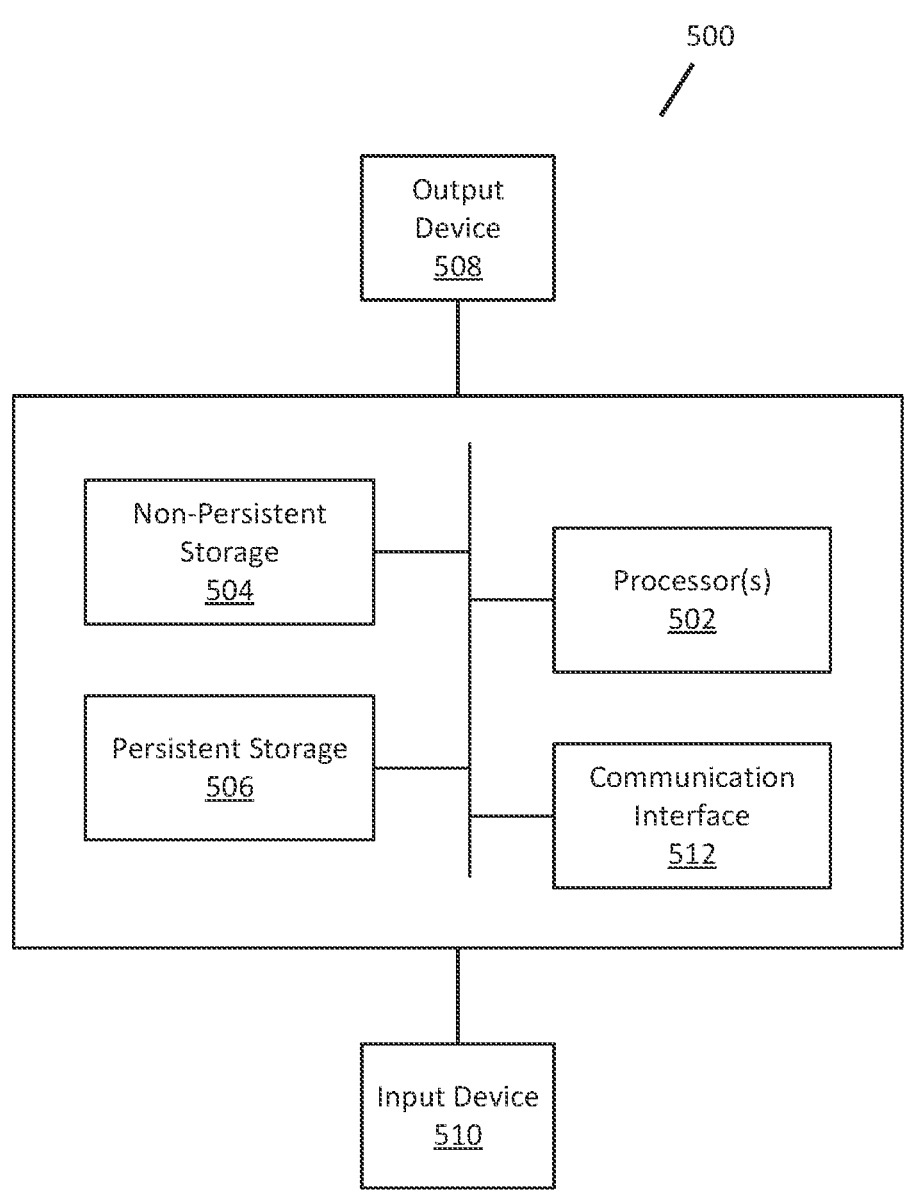
FIG. 5 illustrates a block diagram of a computing device, in accordance with one or more embodiments of this disclosure.

FIG. 5 illustrates a block diagram of a computing device, in accordance with one or more embodiments of this disclosure. As discussed above, embodiments described herein may be implemented using computing devices. For example, the all or any portion of the components shown in FIG. 1 may be implemented, at least in part, using one or more computing devices, and all or any portion of the method shown in FIG. 2 may be performed using one or more computing devices, such as the computing device 500. The computing device 500 may include one or more computer processors 502, non-persistent storage 504 (e.g., volatile memory, such as random access memory (RAM), cache memory, etc.), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), input devices 510, output devices 508, and numerous other elements (not shown) and functionalities. Each of these components is described below.

In one or more embodiments, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be an application specific integrated circuit (ASIC), a graphics processing unit (GPU), a data processing unit (DPU), a tensor processing units (TPU), an associative processing unit (APU), a vision processing units (VPU), a quantum processing units (QPU), and/or various other processing units that use special purpose hardware (e.g., field programmable gate arrays (FPGAs), System-on-a-Chips (SOCs), digital signal processors (DSPs), etc.), etc. Although only one processor 502 is shown in FIG. 5, the computing device 500 may include any number of processors without departing from the scope of embodiments disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more embodiments, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like.

However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this disclosure) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of embodiments disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this disclosure, will appreciate that other embodiments can be devised which do not depart from the scope of embodiments as disclosed herein. Accordingly, the scope of embodiments described herein should be limited only by the attached claims.

What is claimed is:

1. A computer-implemented method, comprising:

receiving, by a first access network device virtual tunnel end point (VTEP) in a campus network, a network data unit intended for a host;

performing, by the first access network device VTEP, a data plane learn to determine initial address resolution protocol (ARP) information for the host, wherein the initial ARP information includes a first local connection between the host and the first access network device VTEP;

creating an initial first VTEP ARP entry for the host using the initial ARP information;

transmitting, by the first access network device VTEP, the network data unit to the host; and transmitting, by the first access network device VTEP, a first control plane update including the initial ARP information to a second access network device VTEP in the campus network, the second access network device VTEP having fast roaming enabled, wherein the second access network device VTEP is configured to create, in response to receiving the first control plane update from the first access network device VTEP, an initial second VTEP ARP entry for the host, the initial second VTEP entry comprising a tunnel connection between the first access network device VTEP and the second access network device VTEP.

2. The computer-implemented method of claim 1, further comprising:

receiving, at the first access network device VTEP, a data plane update from the host via the access network device second VTEP indicating a host movement from the first access network device VTEP to the second access network device VTEP; and updating the initial first VTEP ARP entry to obtain an updated first VTEP ARP entry for the host comprising the tunnel connection between the first access network device VTEP and the second access network device VTEP.

3. The computer-implemented method of claim 1, further comprising:

receiving, at the first access network device VTEP, a second control plane update from the host via the second access network device VTEP indicating a host movement from the first access network device VTEP to the second access network device VTEP; and updating the initial first VTEP ARP entry to obtain an updated first VTEP ARP entry for the host comprising the tunnel connection between the first access network device VTEP and the second access network device VTEP.

4. The computer-implemented method of claim 1, further comprising:

receiving, by the second access network device VTEP, a gratuitous ARP (GARP) reply from the host after a host movement from the first access network device VTEP to the second access network device VTEP, wherein the GARP reply is received via a second local connection between the host and the second access network device VTEP; and updating, by the second access network device VTEP, the initial second VTEP ARP entry for the host to obtain an updated ARP entry for the host comprising the second local connection between the host and the second access network device VTEP.

5. The computer-implemented method of claim 4, further comprising:

receiving, by the first access network device VTEP, the GARP reply from the host via the second access network device VTEP over the tunnel connection between the first access network device VTEP and the second access network device VTEP;

updating, by the first access network device VTEP, the initial first VTEP ARP entry to obtain an updated first VTEP ARP entry for the host comprising the tunnel connection between the first access network device VTEP and the second access network device VTEP;

receiving, by the first access network device VTEP and after updating the initial first VTEP entry to obtain the updated first VTEP entry, a control plane update corresponding to the host and comprising a different tunnel connection between the first access network device VTEP and a third access network device VTEP; and ignoring, by the first access network device VTEP, the control plane update.

6. The computer-implemented method of claim 4, further comprising:

receiving, by the first access network device VTEP, the GARP reply from the host via the second access network device VTEP over the tunnel connection between the first access network device VTEP and the second access network device VTEP;

updating, by the first access network device VTEP, the initial first VTEP ARP entry to obtain an updated first VTEP ARP entry for the host comprising the tunnel connection between the first access network device VTEP and the second access network device VTEP;

receiving, by the first access network device VTEP and after updating the initial first VTEP entry to obtain the updated first VTEP entry, a data plane update corresponding to the host and comprising a different tunnel connection between the first access network device VTEP and a third access network device VTEP; and updating, by the first access network device VTEP, the updated first VTEP ARP entry to obtain a new first VTEP ARP entry comprising the different tunnel connection between the first access network device VTEP and the third access network device VTEP.

7. The computer-implemented method of claim 1, wherein the first access network device VTEP and the second access network device VTEP have a common active gateway Internet Protocol (IP) address and active gateway Media Access Control (MAC) address.

8. A system comprising:

one or more processors; and one or more non-transitory computer readable media storing instructions which, when executed by the one or more processors, cause the one or more processors to:

receive, by a first access network device virtual tunnel end point (VTEP) a campus network, a network data unit intended for a host;

perform, by the first access network device VTEP, a data plane learn to determine initial address resolution protocol (ARP) information for the host, wherein the initial ARP information includes a first local connection between the host and the first access network device VTEP;

create an initial first VTEP ARP entry for the host using the initial ARP information;

transmit, by the first access network device VTEP, the network data unit to the host; and transmit, by the first access network device VTEP, a first control plane update including the initial ARP information to a second access network device VTEP in the campus network, the second access network device VTEP having fast roaming enabled, wherein the second access network device VTEP is configured to create, in response to receiving the first control plane update from the first access network device VTEP, an initial second VTEP ARP entry for the host, the initial second VTEP entry comprising a tunnel connection between the first access network device VTEP and the second access network device VTEP.

9. The system of claim 8, wherein execution of the instructions by the one or more processors further cause the one or more processors to:

receive, at the first access network device VTEP, a data plane update from the host via the second access network device VTEP indicating a host movement from the first access network device VTEP to the second access network device VTEP; and update the initial first VTEP ARP entry to obtain an updated first VTEP ARP entry for the host comprising the tunnel connection between the first access network device VTEP and the second access network device VTEP.

10. The system of claim 8, wherein execution of the instructions by the one or more processors further cause the one or more processors to:

receive, at the first access network device VTEP, a second control plane update from the host via the second access network device VTEP indicating a host movement from the first access network device VTEP to the second access network device VTEP; and update the initial first VTEP ARP entry to obtain an updated first VTEP ARP entry for the host comprising the tunnel connection between the first access network device VTEP and the second access network device VTEP.

11. The system of claim 8, wherein execution of the instructions by the one or more processors further cause the one or more processors to:

receive, by the second access network device VTEP, a gratuitous ARP (GARP) reply from the host after a host movement from the first access network device VTEP to the second access network device VTEP, wherein the GARP reply is received via a second local connection between the host and the second access network device VTEP; and update, by the second access network device VTEP, the initial second VTEP ARP entry for the host to obtain an updated ARP entry for the host comprising the second local connection between the host and the second access network device VTEP.

12. The system of claim 11, wherein execution of the instructions by the one or more processors further cause the one or more processors to:

receive, by the first access network device VTEP, the GARP reply from the host via the second access network device VTEP over the tunnel connection between the first access network device VTEP and the second access network device VTEP;

update, by the first access network device VTEP, the initial first VTEP ARP entry to obtain an updated first VTEP ARP entry for the host comprising the tunnel connection between the first access network device VTEP and the second access network device VTEP;

receive, by the first access network device VTEP and after updating the initial first VTEP entry to obtain the updated first VTEP entry, a control plane update corresponding to the host and comprising a different tunnel connection between the first access network device VTEP and a third access network device VTEP; and ignore, by the first access network device VTEP, the control plane update.

13. The system of claim 11, wherein execution of the instructions by the one or more processors further cause the one or more processors to:

receiving, by the first access network device VTEP, the GARP reply from the host via the second access network device VTEP over the tunnel connection between the first access network device VTEP and the second access network device VTEP;

updating, by the first access network device VTEP, the initial first VTEP ARP entry to obtain an updated first VTEP ARP entry for the host comprising the tunnel connection between the first access network device VTEP and the second access network device VTEP;

receiving, by the first access network device VTEP and after updating the initial first VTEP entry to obtain the updated first VTEP entry, a data plane update corresponding to the host and comprising a different tunnel connection between the first access network device VTEP and a third access network device VTEP; and updating, by the first access network device VTEP, the updated first VTEP ARP entry to obtain a new first VTEP ARP entry comprising the different tunnel connection between the first access network device VTEP and the third access network device VTEP.

14. The system of claim 8, wherein the first access network device VTEP and the second access network device VTEP have a common active gateway Internet Protocol (IP) address and active gateway Media Access Control (MAC) address.

15. A non-transitory computer-readable medium storing programming for execution by one or more processors, the programming comprising instructions to:

receive, by a first access network device virtual tunnel end point (VTEP) executing on a network device in a campus network, a network data unit intended for a host;

perform, by the first access network device VTEP, a data plane learn to determine initial address resolution protocol (ARP) information for the host, wherein the initial ARP information includes a first local connection between the host and the first access network device VTEP;

create an initial first VTEP ARP entry for the host using the initial ARP information;

transmit, by the first access network device VTEP, the network data unit to the host; and transmit, by the first access network device VTEP, a first control plane update including the initial ARP information to a second access network device VTEP in the campus network, the second access network device VTEP having fast roaming enabled, wherein the second access network device VTEP is configured to create, in response to receiving the first control plane update from the first access network device VTEP, an initial second VTEP ARP entry for the host, the initial second VTEP entry comprising a tunnel connection between the first access network device VTEP and the second access network device VTEP.

16. The non-transitory computer-readable medium of claim 15, wherein the programming comprises further instructions to:

receive, at the first access network device VTEP, a data plane update from the host via the second access network device VTEP indicating a host movement from the first access network device VTEP to the second access network device VTEP; and update the initial first VTEP ARP entry to obtain an updated first VTEP ARP entry for the host comprising the tunnel connection between the first access network device VTEP and the second access network device VTEP.

17. The non-transitory computer-readable medium of claim 15, wherein the programming comprises further instructions to:

receive, at the first access network device VTEP, a second control plane update from the host via the second access network device VTEP indicating a host movement from the first access network device VTEP to the second access network device VTEP; and update the initial first VTEP ARP entry to obtain an updated first VTEP ARP entry for the host comprising the tunnel connection between the first access network device VTEP and the second access network device VTEP.

18. The non-transitory computer-readable medium of claim 15, wherein the programming comprises further instructions to:

receive, by the second access network device VTEP, a gratuitous ARP (GARP) reply from the host after a host movement from the first access network device VTEP to the second access network device VTEP, wherein the GARP reply is received via a second local connection between the host and the second access network device VTEP; and update, by the second access network device VTEP, the initial second VTEP ARP entry for the host to obtain an updated ARP entry for the host comprising the second local connection between the host and the second access network device VTEP.

19. The non-transitory computer-readable medium of claim 18, wherein the programming comprises further instructions to:

receive, by the first access network device VTEP, the GARP reply from the host via the second access network device VTEP over the tunnel connection between the first access network device VTEP and the second access network device VTEP;

update, by the first access network device VTEP, the initial first VTEP ARP entry to obtain an updated first VTEP ARP entry for the host comprising the tunnel connection between the first access network device VTEP and the second access network device VTEP;

receive, by the first access network device VTEP and after updating the initial first VTEP entry to obtain the updated first VTEP entry, a control plane update corresponding to the host and comprising a different tunnel connection between the first access network device VTEP and a third access network device VTEP; and ignore, by the first access network device VTEP, the control plane update.

20. The non-transitory computer-readable medium of claim 18, wherein the programming comprises further instructions to:

receive, by the first access network device VTEP, the GARP reply from the host via the second access network device VTEP over the tunnel connection between the first access network device VTEP and the second access network device VTEP;

update, by the first access network device VTEP, the initial first VTEP ARP entry to obtain an updated first VTEP ARP entry for the host comprising the tunnel connection between the first access network device VTEP and the second access network device VTEP;

receive, by the first access network device VTEP and after updating the initial first VTEP entry to obtain the updated first VTEP entry, a data plane update corresponding to the host and comprising a different tunnel connection between the first access network device VTEP and a third access network device VTEP; and update, by the first access network device VTEP, the updated first VTEP ARP entry to obtain a new first VTEP ARP entry comprising the different tunnel connection between the first access network device VTEP and the third access network device VTEP.

\* \* \* \* \*